Nov. 12, 1940.  W. H. TAYLOR  2,221,657

METHOD OF MAKING ENGINE VALVES

Filed Feb. 4, 1938

INVENTOR.
WILLIAM H. TAYLOR
BY
*John H. Leonard*
ATTORNEY.

Patented Nov. 12, 1940

2,221,657

UNITED STATES PATENT OFFICE 2,221,657

METHOD OF MAKING ENGINE VALVES

William H. Taylor, Mentor, Ohio, assignor to William H. Taylor, as trustee, and his successor trustee Application February 4, 1938, Serial No. 188,722

6 Claims. (Cl. 29—156.7)

This invention relates to poppet valves and to a method of making the same, and particularly to a valve for an internal combustion engine.

The valve of the present invention is an improvement on the valve described in United States Letters Patent No. 1,959,394, issued to me on May 22, 1934, and entitled "Engine valve." As therein more fully described, a valve having a stem which is radially yieldable, has numerous advantages. Such a stem may be fitted into the valve guide without operating clearance so that the walls of the stem and guide operate in metal to metal contact with each other and conduct heat readily from the stem into the guide from which it is dissipated into the engine mass or the cooling water of the engine water jacket which surrounds the guide. Any expansion of the stem, due to heating or otherwise, is compensated, due to the radial yieldability of the stem which is obtained by slots which extend longitudinally of the stem.

It was one of the objects of the present invention to provide an improved resilient stem valve which is capable of withstanding any exhaust gas temperature to which it is subjected in any of the present day high compression, internal combustion engines.

Another object is to provide a valve of this character with a head adapted to withstand action of the heated exhaust gases more effectively.

Another object is to provide a valve of this general character which may be used for intake or exhaust.

Still another object is to provide an improved method of making a high heat resistant resilient stem valve.

Other objects and advantages will become apparent from the following specification, wherein reference is made to the drawing, in which—

Figure 1:
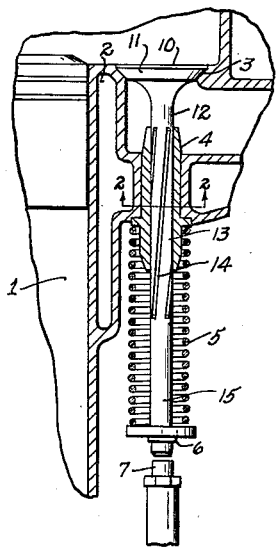
Fig. 1 is a side elevation of a valve embodying the principles of the present invention, the associated valve guide, adjacent portions of the engine, and accessory parts being shown therewith and partly in section for clearness in illustration.

Referring first to Figs. 1 to 7 inclusive, the valve is shown in Fig. 1 in closed position in connection with an engine block 1 having a water jacket 2 and a valve seat 3. The valve is slidably supported in a suitable guide 4 and seated by the usual spring 5 which is interposed between the bottom of the guide 4 and a suitable spring retaining collar 6 disposed in a groove on the valve stem. The valve is lifted in the usual manner by a tappet 7.

The valve comprises a head 10 having a seat 11 complementary to the seat 3. The head has a stem portion 12 extending therefrom and to the end of the stem portion 12 a resilient stem portion 13 is connected, preferably by welding.

In the form illustrated, the resiliency of the portion 13 results from a plurality of slots 14 which extend generally radially of the stem so as to intersect each other at a common intersection which provides, in operative effect, a central bore. The slots 14 preferably extend slightly spirally about the axis of the stem, for example, each slot is spiralled from its lower end to its upper end to provide about one-quarter of a complete spiral convolution. On the lower end of the resilient portion 13 is a butt portion 15 having an annular groove 16 for accommodating the spring retaining collar 6.

The finished valve thus described is substantially the same as that shown in my United States Letters Patent No. 1,959,394, except that the slots 14 are arranged spirally, the stem is yieldable substantially coextensively with all portions of the stem, the peripheral surfaces of which are broken circumferentially by slots, and a sealing member 17 is incorporated in the stem so as to seal the slots and reduce the passage of air and oil therethrough.

The stem portion 13 is preferably made so that when cooled it is normally slightly oversize with respect to the bore of the guide 4. As a result, when it is inserted in the bore, it is slightly compressed, and thus the outer circumferential walls of the portion 13 are in metal to metal contact with the walls of the guide bore and the sealing member 17 obstructs the passages through the slots. As a result, the valve may be used either as an intake valve or an exhaust valve, and very beneficial effects are obtained in either instance. In the latter, "blow-by" or the discharge of heated gases between the stem and guide and through the slots is reduced or eliminated and consequently the distance the slots extend above the guide is relatively less important. In the former, the drawing in of air between the stem and guide and through the slots, which former effect is present in connection with solid stem valves due to the radial clearance required between the valve stem and walls of the guide for expansion is eliminated. This makes possible a more accurate mixture between the air and gasoline in the carburetor. The mixture cannot be kept constant if clearance exists between the valve stem and guide, as in the case of solid stem valves, due to the fact that the flow of air between the stem and guide is not constant but varies as the speed of the engine varies, and this variation is not directly proportional to the intake of air through the carburetor.

The wick 17 is preferably made of asbestos composition, fine metal screen, or layers of asbestos and fine screen, so that it is not deleteriously affected by heat and at the same time may seal the slots 14 and engage the wall of the guide and actually assist in the conduction of heat from the stem into the guide.

Figure 2:
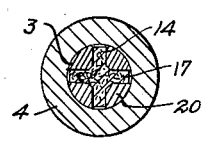
Fig. 2 is a sectional view taken on a plane indicated by the line 2—2 in Fig. 1.
Figure 3:
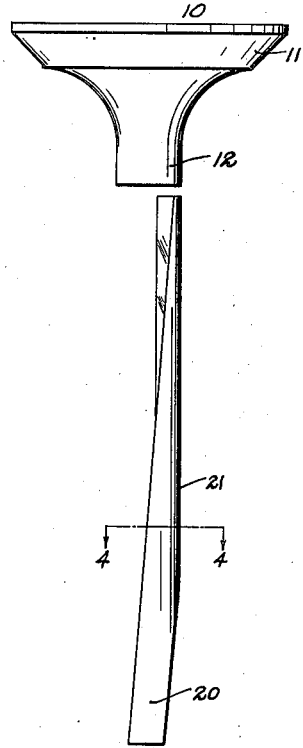
Fig. 3 illustrates the parts from which the valve is formed.
Figure 4:
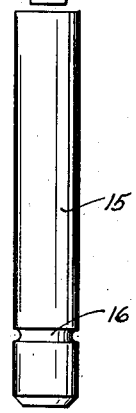
Fig. 4 is an enlarged sectional view of one of the parts illustrated in Fig. 3.
Figure 6:
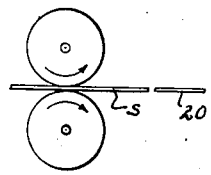
Fig. 6 is a diagrammatic illustration of the manner of making certain parts of the valve stem.
Figure 8:
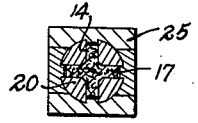
Fig. 8 is a cross-sectional view taken on a plane indicated by the line 8—8 of Fig. 7.
Figure 7:
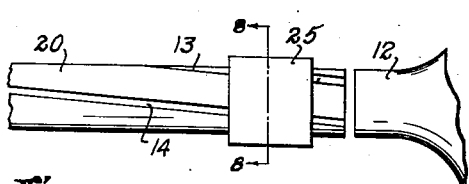
Fig. 7 is a fragmentary view illustrating one step in the method of making the valve.

In order to make the valve illustrated in Figs. 1 and 2, a strip of metal stock S is rolled, as indicated in Fig. 6, to a cross section which is substantially in the form of a circular segment or sector, preferably the latter, with the apex comparatively blunt. Suitable lengths or stem segments 20 of the stock are then severed. By virtue of the rolling operation, an extremely smooth finish is provided on the outer circumferential surface 21 of each segment 20. During the rolling operation, the stock is given a sufficient twist so that in the length of a piece of the stock used for the yieldable portion 13 of the valve stem, the piece forms about one-quarter of a complete spiral convolution. Regardless of the spiral, the outer surface 21 is of constant radius in a plane normal to the axis of the valve stem.

Figure 5:
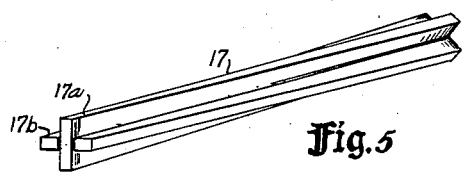
Fig. 5 is a sealing member used in connection with the present invention.

The sealing member 17 is preferably formed of two duplicate pieces 17ª and 17ᵇ, each of which is slotted from one end, the two being nested as illustrated in Fig. 5. In this nested and assembled condition they are disposed between the segments 20 which are to form the resilient portion 13 of the valve stem. A number of segments 20, depending on the number of slots 14 required, are assembled and then secured to the stem portion 12 and butt portion 15. In the form illustrated, the valve is to be provided with four slots, in which case four segments 20 are used. These segments are gripped in suitable chuck-jaws 25, the sealing member 17 being installed between the segments 20, holding them apart, and the segments are then held in assembled relation with respect to each other. While they are held in this condition, one end of the assemblage is welded to the stem portion 12 of the valve head, and the other end is welded to the butt portion 15 of the valve stem.

A valve, such as described, may be used without grinding of the stem, if desired, but if grinding is to be practiced, it is preferably done by supporting the valve against a suitable form or in a suitable collar arranged to expose the guide engaging portion of the surface to a grinding wheel while supporting the stem for rotation. If desired due to the spiral arrangement of the slots, centerless grinding may be employed as the danger of radial distortion is greatly reduced.

Having thus described my invention, I claim:

1. The method of forming a resilient stem valve which comprises forming a plurality of stem segments, each segment forming a part of a spiral convolution, assembling the segments in circumferentially spaced relation to each other and in the form of a resilient radially yieldable stem portion of generally circular cross section having slots between the portions, securing one end of the assembled segments to the common butt stem portion and securing the other end of the assembled segments to a valve portion having a head.

2. In making a valve with at least three circumferentially separated yieldable stem portions for contact with a guide, and solid head and butt stem portions beyond the yieldable portions in respective directions; the method which includes forming the yieldable portions separate from one of the solid portions, inserting a unitary yieldable sealing member into the space provided between the yieldable portions and then welding the solid portions to the free ends of the yieldable portions, thereby holding the unitary sealing member in place between the yieldable portions against movement toward said last mentioned solid portion.

3. In making a valve with at least three circumferentially separated yieldable stem portions for contact with a guide, and solid head and butt stem portions beyond the yieldable portions in respective directions; the method comprising forming the yieldable portions separate from both solid portions, assembling the yieldable portions in spaced relationship to each other and about a common axis, welding one of said solid portions to adjacent ends of the yieldable portions, then inserting between the yieldable portions a unitary compressible sealing member, and then welding the other solid portion to the free ends of the yieldable portions, thereby holding the sealing member in place.

4. The method of forming a resilient stem valve comprising forming a plurality of elongated helically curved members, assembling said members about a common axis and in spaced relation to each other, welding solid head and butt stem members to the respective ends of the assembled curved members and then finishing the stem portion provided by the curved members by centerless grinding.

5. The method of making a resilient stem valve, comprising working metal as between rolls to form an elongated strip of generally segmental section, cutting a plurality of substantially equal lengths from said strip, assembling said length around a common axis with adjacent substantially radial faces out of contact, and then welding metallic valve head and stem members to the assembled strips.

6. The method of making a radially resilient stem poppet valve for an internal combustion engine having a port and a guide some distance from the port, comprising forming a plurality of stem segments, assembling the segments in circumferentially spaced relation to each other about a common axis, forming a head with an elongated stem portion on it adapted to extend from the head to the stem guide of the engine in the closed position of the head against the port, welding the stem portion of the head to one end of the assembly of segments, and welding a butt stem portion to the opposite end of the assembly.

WILLIAM H. TAYLOR.